US012706412B2

(12) United States Patent
Kinoshita et al.

(10) Patent No.: US 12,706,412 B2
(45) Date of Patent: Aug. 11, 2026

(54) CONNECTOR

(71) Applicant: Japan Aviation Electronics Industry, Limited, Tokyo (JP)

(72) Inventors: Takumi Kinoshita, Tokyo (JP); Akihiro Matsunaga, Tokyo (JP); Kenta Ashibu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 535 days.

(21) Appl. No.: 17/973,931

(22) Filed: Oct. 26, 2022

(65) Prior Publication Data

US 2023/0223717 A1 Jul. 13, 2023

(30) Foreign Application Priority Data

Jan. 12, 2022 (JP) ................................ 2022-002923

(51) Int. Cl.

*H01R 13/502* (2006.01)
*H01R 4/10* (2006.01)
*H01R 13/22* (2006.01)

(52) U.S. Cl.

CPC ............ *H01R 13/502* (2013.01); *H01R 4/10* (2013.01); *H01R 13/22* (2013.01)

(58) Field of Classification Search

CPC .... H01R 13/22; H01R 13/502; H01R 13/592; H01R 13/514; H01R 13/02; H01R 4/10; H01R 12/63; H01R 12/592

USPC .......................... 439/625, 449; 174/154–158

See application file for complete search history.

(56) References Cited

U.S. PATENT DOCUMENTS

| | | | | |
|---|---|---|---|---|
| 6,310,407 | B1 | 10/2001 | Saito et al. | |
| 2018/0233854 | A1 | 8/2018 | Komoto et al. | |
| 2019/0027842 | A1* | 1/2019 | Hashiguchi | H01R 13/2457 |
| 2020/0287306 | A1* | 9/2020 | Hashiguchi | H01R 12/675 |
| 2021/0273349 | A1* | 9/2021 | Carlsson | A41D 1/005 |

FOREIGN PATENT DOCUMENTS

| | | | |
|---|---|---|---|
| DE | 11 2017 005137 | T5 | 7/2019 |
| EP | 3 435 490 | A1 | 1/2019 |
| EP | 3 800 739 | A1 | 4/2021 |
| JP | S56-13369 | U | 2/1981 |
| JP | 2014-203815 | A | 10/2014 |
| JP | 2018-129244 | A | 8/2018 |
| WO | WO-2020/018009 | A1 | 1/2020 |

* cited by examiner

*Primary Examiner* — Christopher M Koehler
*Assistant Examiner* — Gregory L Mangot
(74) *Attorney, Agent, or Firm* — MUNCY, GEISSLER, OLDS & LOWE, P.C.

(57) ABSTRACT

A connector includes a base member and a contact connected to a connection object, a first surface of the base member making contact with a bottom surface of a sheet-like conductive member, the contact being fixed to the base member by a deformed portion of the projection in a state where a root portion of the projection is accommodated in a projection accommodating portion with the sheet-like conductive member being sandwiched therebetween, an inner peripheral surface of the projection accommodating portion making contact with a flexible conductor of the sheet-like conductive member, whereby the connection object is electrically connected to the flexible conductor via the contact.

8 Claims, 11 Drawing Sheets

CONNECTOR

BACKGROUND OF THE INVENTION

The present invention relates to a connector, particularly to a connector in which a conductive connection object is connected to a flexible conductor of a sheet-like conductive member.

In recent years, attention has been drawn to so-called smart clothes that can obtain user's biological data such as the heart rate and the body temperature only by being worn by the user. Such a smart cloth is equipped with an electrode disposed at a measurement position and formed of a flexible conductor, and when a wearable device serving as a measurement device is electrically connected to the electrode, it is possible to send biological data to the wearable device.

Connection between the electrode and the wearable device can be established by using, for example, a connector to be connected to the flexible conductor.

As a connector of this type, for example, JP 2018-129244 A discloses a connector shown in FIG. 26. This connector includes a housing 2 and a base member 3 that are separately disposed on opposite sides across a flexible substrate 1 to sandwich the flexible substrate 1. A tubular portion 4A of a contact 4 is passed through a contact through-hole 2A of the housing 2, and a flange 4B of the contact 4 is sandwiched between the housing 2 and a flexible conductor 1A exposed on a surface of the flexible substrate 1.

In this state, by pushing the base member 3 toward the housing 2, as shown in FIG. 27, a projection 3A of the base member 3 is inserted into a projection accommodating portion 4C of the contact 4 with the flexible substrate 1 being sandwiched therebetween, and an inner surface of the projection accommodating portion 4C makes contact with the flexible conductor 1A with a predetermined contact force, whereby the contact 4 is electrically connected to the flexible conductor 1A.

In addition, as shown in FIG. 26, the housing 2 and the base member 3 are fixed to each other by press-fitting a housing fixing post 3B, which is formed to project on the base member 3, into a post accommodating portion 2B of the housing 2.

When a wearable device is fitted with the connector disclosed in JP 2018-129244 A, the wearable device can be connected to an electrode formed of a flexible conductor.

However, in the case where the wearable device is disposed apart from a measurement position, it is necessary to constitute an electrical path from the electrode disposed at the measurement position to an attachment position of the connector, and when such an electrical path is formed of the flexible conductor, electric resistance becomes high, and cost increases.

To cope with it, in order to connect an electrode formed of a flexible conductor to a wearable device by an inexpensive electric wire with low electric resistance, the development of a small-sized connector for connecting a connection object such as an electric wire to a flexible conductor disposed on a garment is desired.

As a connector of this time, by using a connector having such a configuration that a projection of a base member is inserted into a projection accommodating portion of a contact with a flexible conductor being sandwiched therebetween as with the connector disclosed in JP 2018-129244 A, a connection object such as an electric wire is connected to the contact, whereby the flexible conductor and the connection object are electrically connected to each other.

However, in the connector of JP 2018-129244 A, since the contact 4 is present, the post accommodating portion 2B and the housing fixing post 3B that are for fixing the housing 2 and the base member 3 to each other need to be separately disposed at positions away from the contact 4, and thus it is difficult to reduce a size of the connector.

SUMMARY OF THE INVENTION

The present invention has been made to solve the conventional problem described above and aims at providing a connector capable of reducing the size thereof while a conductive connection object is connected to a flexible conductor of a sheet-like conductive member.

A connector according to the present invention is one in which a connection object having conductivity is connected to a flexible conductor exposed at least on a top surface of a sheet-like conductive member having the top surface and a bottom surface facing in opposite directions from each other, the connector comprising:

- a base member including a first surface facing the bottom surface of the sheet-like conductive member and a projection formed to project on the first surface; and
- a contact having conductivity, the contact including a projection accommodating portion of recess shape through which the projection of the base member penetrates and being connected to the connection object,
- wherein the projection includes a root portion accommodated in the projection accommodating portion of the contact, an extending portion jointed to the root portion, and a deformed portion overhanging from a tip of the extending portion in a direction along the first surface, and
- wherein the first surface of the base member makes contacts with the bottom surface of the sheet-like conductive member, the contact is fixed to the base member by the deformed portion of the projection in a state where the root portion of the projection is accommodated in the projection accommodating portion with the sheet-like conductive member being sandwiched therebetween, and an inner peripheral surface of the projection accommodating portion makes contact with the flexible conductor of the sheet-like conductive member in a direction parallel to the first surface, whereby the connection object is electrically connected to the flexible conductor via the contact.

DETAILED DESCRIPTION OF THE INVENTION

Embodiments of the present invention are described below with reference to the accompanying drawings.

Embodiment 1

Figure 1:
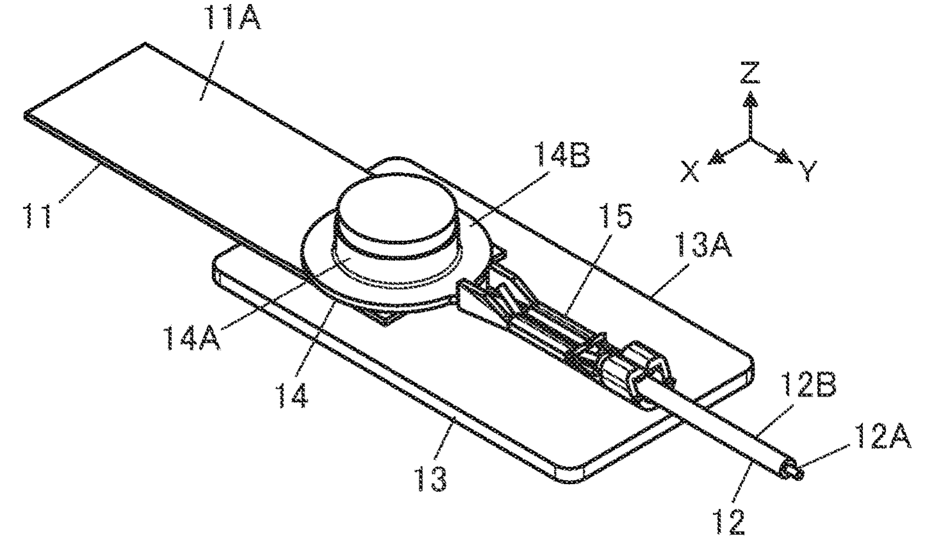
FIG. 1 is a perspective view showing a connector according to Embodiment 1.
Figure 2:
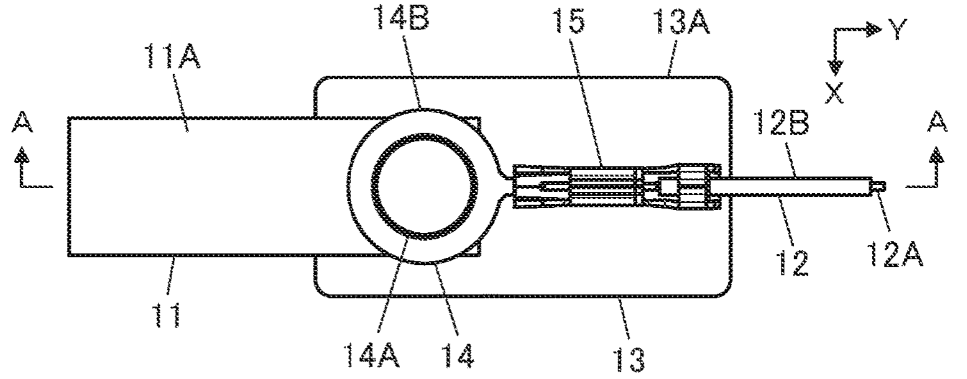
FIG. 2 is a plan view showing the connector according to Embodiment 1.

FIGS. 1 and 2 show a connector according to Embodiment 1. This connector is configured such that a covered electric wire 12 being a conductive connection object is connected to a sheet-like conductive member 11, and includes a base member 13 made of an insulating resin material, and a conductive contact 14 held by the base member 13.

The sheet-like conductive member 11 has a top surface and a bottom surface facing in opposite directions from each other and has a flexible conductor 11A exposed at least on the top surface. As the sheet-like conductive member 11, conductive cloth woven using a conductive thread such as silver can be used, for example. When such conductive cloth is used, the flexible conductor 11A is exposed not only on the top surface but also on the bottom surface of the sheet-like conductive member 11. In addition, one obtained by applying a conductive ink on a surface of cloth having no conductivity by printing or another method to form the flexible conductor 11A on the surface can also be used as the sheet-like conductive member 11. Further, a member obtained by forming the flexible conductor 11A formed of a conductive pattern on a surface of an insulating sheet body of a resin film or the like may be used as the sheet-like conductive member 11.

The sheet-like conductive member 11 shown in FIGS. 1 and 2 has a band shape extending in a predetermined direction.

The covered electric wire 12 has such a structure that an outer periphery of a conductor portion 12A is covered with a covering portion 12B made of an insulating material. With the connector according to Embodiment 1, the conductor portion 12A of the covered electric wire 12 is electrically connected to the flexible conductor 11A of the sheet-like conductive member 11.

The covered electric wire 12 shown in FIGS. 1 and 2 extends in the same direction as the direction in which the sheet-like conductive member 11 of band shape extends.

The base member 13 includes a flat plate portion 13A of rectangular shape extending in parallel to the sheet-like conductive member 11, and the sheet-like conductive member 11 and the covered electric wire 12 are electrically connected to each other on a surface of the flat plate portion 13A.

The contact 14 includes a tubular portion 14A of cylindrical shape having a central axis extending in a direction perpendicular to the flat plate portion 13A of the base member 13, and a flange 14B of annular shape joined to one end of the tubular portion 14A and extending along the surface of the flat plate portion 13A.

In addition, a crimp terminal portion 15 integrally formed with the contact 14 is joined to the flange 14B of the contact 14, and an end portion of the covered electric wire 12 is connected to the crimp terminal portion 15.

For convenience, the predetermined direction in which the sheet-like conductive member 11 extends toward the base member 13 is called "+Y direction," the width direction of the sheet-like conductive member 11 of band shape "X direction," and the direction orthogonal to an XY plane "Z direction."

The sheet-like conductive member 11 and the flat plate portion 13A of the base member 13 extend along an XY plane, a +Y directional end portion of the sheet-like conductive member 11 is connected to the contact 14, and a −Y directional end portion of the covered electric wire 12 is connected to the contact 14 via the crimp terminal portion 15.

Figure 3:
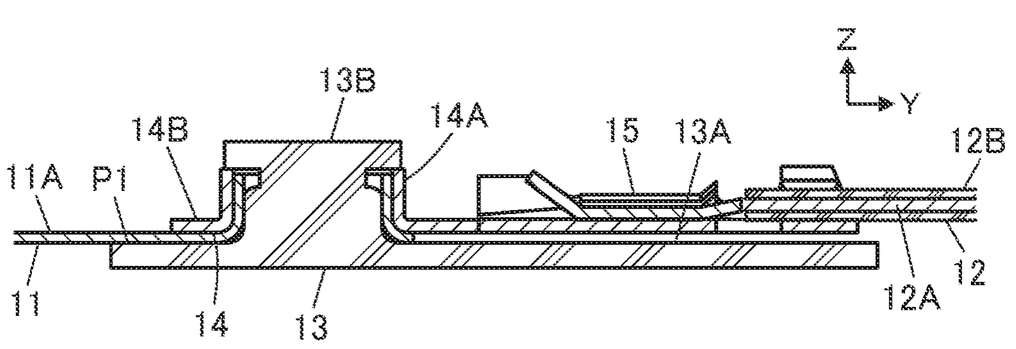
FIG. 3 is a cross-sectional view taken along line A-A in FIG. 2.

As shown in FIG. 3, a +Z directional surface of the flat plate portion 13A of the base member 13 forms a first surface P1, and a projection 13B of substantially columnar shape extending in the +Z direction is formed to project on the first surface P1.

A cut-out portion (not shown) is formed near the +Y directional end portion of the sheet-like conductive member 11, and the projection 13B of the base member 13 penetrates the cut-out portion of the sheet-like conductive member 11 and the tubular portion 14A of the contact 14. Therefore, the sheet-like conductive member 11 is sandwiched between the tubular portion 14A of the contact 14 and an outer peripheral surface of the projection 13B.

In addition, the crimp terminal portion 15 integrally formed with the contact 14 is disposed on the surface of the flat plate portion 13A of the base member 13, and the conductor portion 12A at the −Y directional end portion of the covered electric wire 12 is drawn from the covering portion 12B and crimped on the crimp terminal portion 15.

Figure 4:
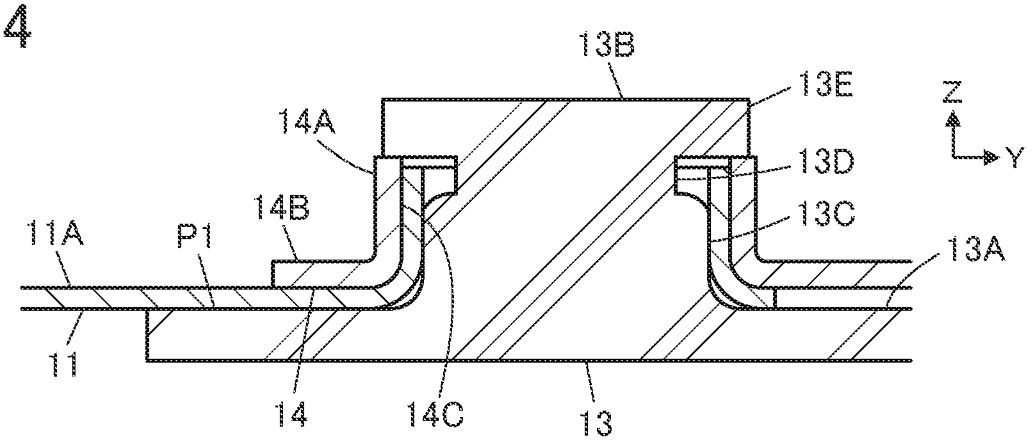
FIG. 4 is an enlarged view of an important part of FIG. 3.

As shown in FIG. 4 that is an enlarged partial view of FIG. 3, the projection 13B of the base member 13 includes a root portion 13C joined to the first surface P1, an extending portion 13D extending in the +Z direction from a +Z directional end portion of the root portion 13C, and a deformed portion 13E joined to a +Z directional end portion of the extending portion 13D.

In addition, a projection accommodating portion 14C of recess shape through which the projection 13B penetrates is formed inside the tubular portion 14A of the contact 14, and the root portion 13C and the extending portion 13D of the projection 13B are accommodated in the projection accommodating portion 14C.

While the first surface P1 of the base member 13 makes contact with the bottom surface on the −Z direction side of the sheet-like conductive member 11, and the flexible conductor 11A is exposed at least on the top surface on the +Z direction side of the sheet-like conductive member 11, the sheet-like conductive member 11 is bent at a right angle at a position where the projection 13B is formed, and extends in the +Z direction while being sandwiched between an outer peripheral surface of the root portion 13C of the projection 13B and an inner peripheral surface of the projection accommodating portion 14C of the contact 14. Accordingly, the inner peripheral surface of the projection accommodating portion 14C of the contact 14 comes into contact with the flexible conductor 11A of the sheet-like conductive member 11 in a direction along an XY plane.

Here, the projection accommodating portion 14C of the contact 14 is formed in advance to have an inside diameter slightly smaller than a dimension obtained by adding a double of a thickness of the sheet-like conductive member 11 to an outside diameter of the root portion 13C of the projection 13B; therefore, the flexible conductor 11A of the sheet-like conductive member 11 is pressed by the root portion 13C of the projection 13B against the inner peripheral surface of the projection accommodating portion 14C of the contact 14 such that a predetermined contact pressure is applied thereto, whereby the contact 14 is electrically connected to the flexible conductor 11A.

In addition, while the tubular portion 14A of the contact 14 has a shape whose +Z directional end portion is opened, the deformed portion 13E of the projection 13B overhangs along an XY plane from the +Z directional end portion of the extending portion 13D and covers the +Z directional end portion of the tubular portion 14A. Consequently, the contact 14 is sandwiched between the deformed portion 13E of the projection 13B and the first surface P1 of the base member 13 and fixed to the base member 13 via the sheet-like conductive member 11.

Figure 5:
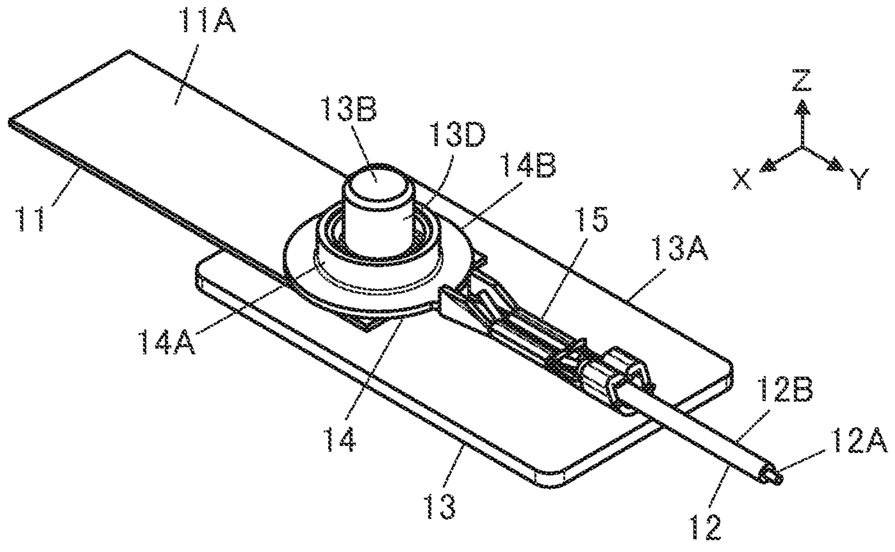
FIG. 5 is a perspective view showing the connector according to Embodiment 1 in the process of assembling.

By inserting the root portion 13C of the projection 13B into the projection accommodating portion 14C of the contact 14 with the sheet-like conductive member 11 being sandwiched therebetween when the deformed portion 13E is not formed at a tip of the extending portion 13D of the projection 13B, the extending portion 13D of the projection 13B is allowed to project in the +Z direction from the tubular portion 14A of the contact 14 as shown in FIG. 5, and thereafter, the deformed portion 13E is formed through heat deformation of the +Z directional end portion of the extending portion 13D of the projection 13B, whereby the connector as above can be assembled.

Note that the conductor portion 12A at the −Y directional end portion of the covered electric wire 12 is drawn from the covering portion 12B and crimped on the crimp terminal portion 15 in advance, and accordingly, the conductor portion 12A of the covered electric wire 12 is electrically connected to the flexible conductor 11A of the sheet-like conductive member 11 via the contact 14 and the crimp terminal portion 15.

In the connector of Embodiment 1, the contact 14 is fixed to the base member 13 by means of the deformed portion 13E situated at a +Z directional end portion of the projection 13B while the flexible conductor 11A of the sheet-like conductive member 11 and the contact 14 are electrically connected to each other with the root portion 13C situated at a −Z directional end portion of the projection 13B of the base member 13. Therefore, unlike the connector of JP 2018-129244 A, it is not necessary to dispose a fixing member at a position away from the contact, whereby the connector can be decreased in size.

When the connector of Embodiment 1 is applied to a smart cloth, and an electrode (not shown) is connected to the flexible conductor 11A of the sheet-like conductive member 11, the electrode disposed at a measurement position and a wearable device can be connected to each other by means of the inexpensive covered electric wire 12 with low electric resistance.

In the connector of Embodiment 1, presence of the deformed portion 13E of the projection 13B allows the flange 14B of the contact 14 to come into contact with the flexible conductor 11A of the sheet-like conductive member 11 disposed on the first surface P1 of the base member 13 with a predetermined contact pressure, and thus the contact 14 is also electrically connected to the flexible conductor 11A via the flange 14B, whereby the reliability of electric connection between the contact 14 and the flexible conductor 11A can be improved.

Embodiment 2

Figure 6:
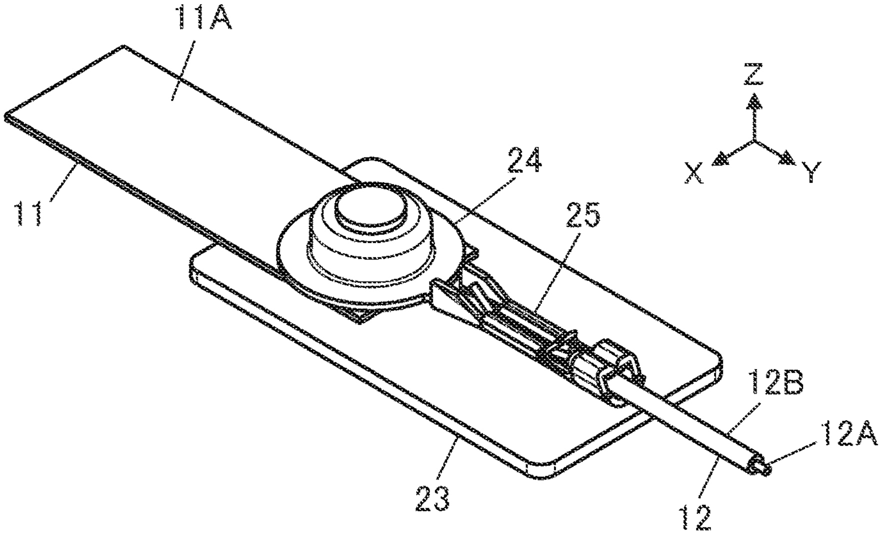
FIG. 6 is a perspective view showing a connector according to Embodiment 2.
Figure 7:
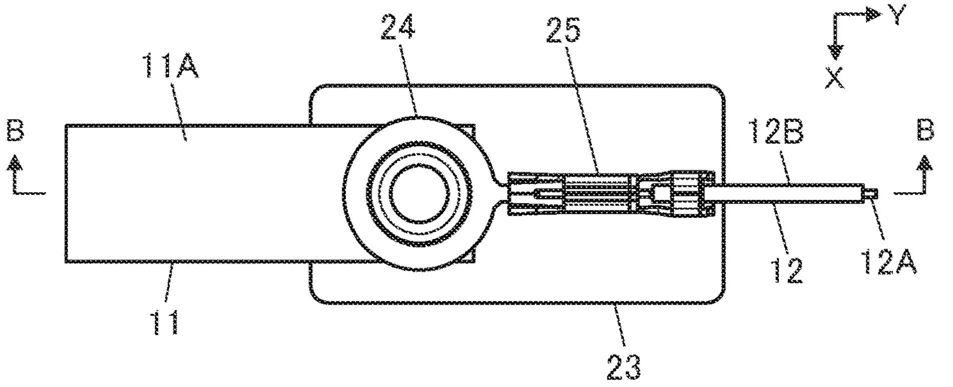
FIG. 7 is a plan view showing the connector according to Embodiment 2.

FIGS. 6 and 7 show a connector according to Embodiment 2. As with the connector of Embodiment 1, this connector is configured such that a covered electric wire 12 being a conductive connection object is connected to a sheet-like conductive member 11, and includes a base member 23 made of an insulating resin material, and a conductive contact 24 held by the base member 23.

The sheet-like conductive member 11 and the covered electric wire 12 are the same as those used in Embodiment 1.

Figure 8:
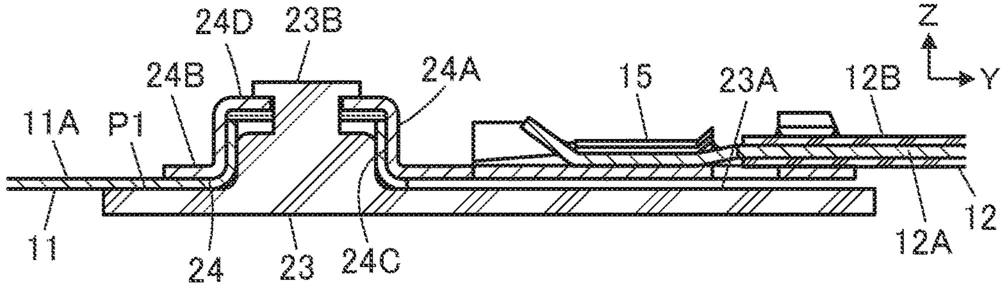
FIG. 8 is a cross-sectional view taken along line B-B in FIG. 7.

As shown in FIG. 8, as with the base member 13 used in Embodiment 1, the base member 23 includes a flat plate portion 23A of rectangular shape extending along an XY plane, a +Z directional surface of the flat plate portion 23A forms a first surface P1, and a projection 23B extending in the +Z direction is formed to project on the first surface P1.

As with the contact 14 used in Embodiment 1, the contact 24 includes a tubular portion 24A of cylindrical shape, and a flange 24B joined to a −Z directional end portion of the tubular portion 24A. A projection accommodating portion 24C is formed inside the tubular portion 24A, and a crimp terminal portion 25 integrally formed with the contact 24 is joined to the flange 24B.

The contact 24 further includes a top plate portion 24D of annular shape joined to a +Z directional end portion of the tubular portion 24A. The top plate portion 24D extends along an XY plane toward a central axis of the tubular portion 24A so as to cover a +Z directional end portion of the projection accommodating portion 24C formed inside the tubular portion 24A.

Figure 9:
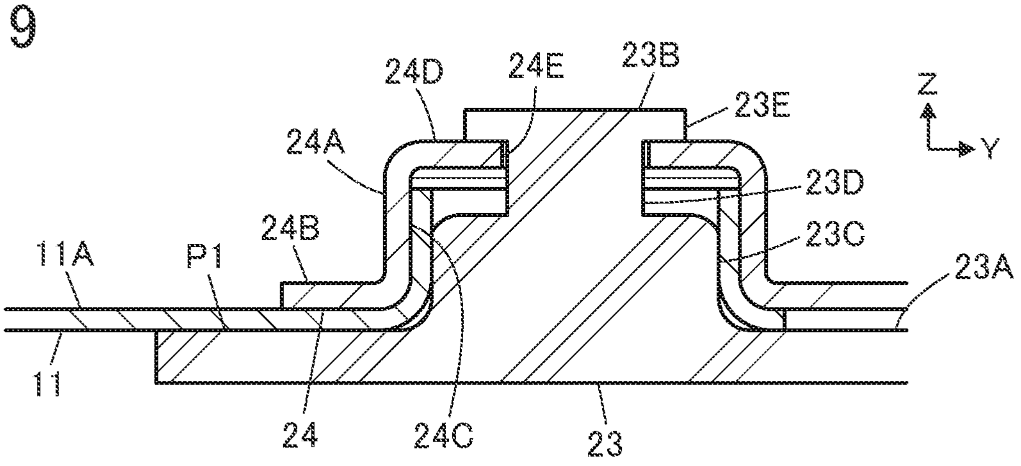
FIG. 9 is an enlarged view of an important part of FIG. 8.

As shown in FIG. 9 that is a partial enlarged view of FIG. 8, the projection 23B of the base member 23 includes a root portion 23C joined to the first surface P1, an extending portion 23D extending in the +Z direction from a +Z directional end portion of the root portion 23C, and a deformed portion 23E joined to a +Z directional end portion of the extending portion 23D. In addition, the top plate portion 24D of the contact 24 is provided with a through hole 24E through which the extending portion 23D of the projection 23B passes.

On the +Z direction side of the top plate portion 24D of the contact 24, the deformed portion 23E of the projection 23B overhangs along an XY plane from the +Z directional end portion of the extending portion 23D and covers the top plate portion 24D around the through hole 24E. Consequently, the contact 24 is sandwiched between the deformed portion 23E of the projection 23B and the first surface P1 of the base member 23 and fixed to the base member 23 via the sheet-like conductive member 11.

As with Embodiment 1, the first surface P1 of the base member 23 makes contact with the bottom surface on the −Z direction side of the sheet-like conductive member 11, and the sheet-like conductive member 11 is bent at a right angle at a position where the projection 23B is formed, and extends in the +Z direction while being sandwiched between an outer peripheral surface of the root portion 23C of the projection 23B and an inner peripheral surface of the projection accommodating portion 24C of the contact 24. Accordingly, the inner peripheral surface of the projection accommodating portion 24C of the contact 24 comes into contact with the flexible conductor 11A of the sheet-like conductive member 11 in a direction along an XY plane.

Here, the projection accommodating portion 24C of the contact 24 is formed in advance to have an inside diameter slightly smaller than a dimension obtained by adding a double of a thickness of the sheet-like conductive member 11 to an outside diameter of the root portion 23C of the projection 23B; therefore, the flexible conductor 11A of the sheet-like conductive member 11 is pressed by the root portion 23C of the projection 23B against the inner peripheral surface of the projection accommodating portion 24C of the contact 24 such that a predetermined contact pressure is applied thereto, whereby the contact 24 is electrically connected to the flexible conductor 11A.

Figure 10:
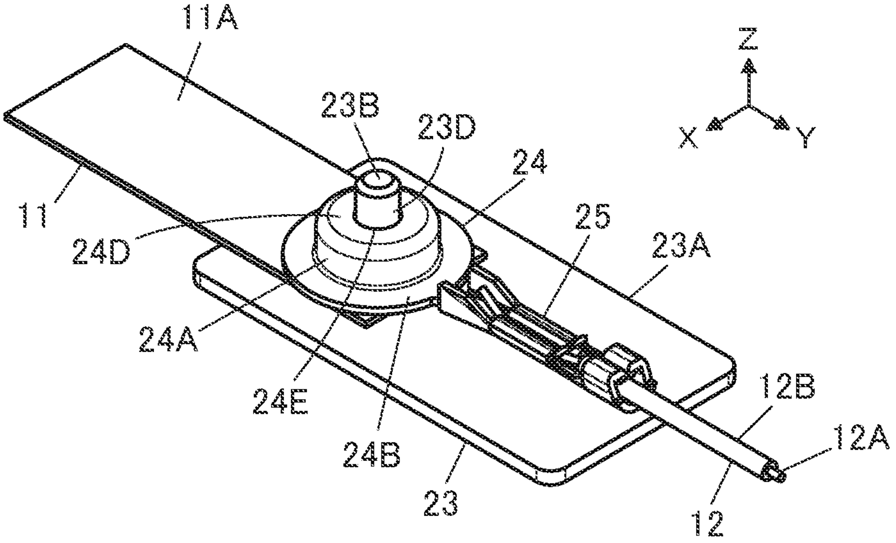
FIG. 10 is a perspective view showing the connector according to Embodiment 2 in the process of assembling.

By inserting the root portion 23C of the projection 23B into the projection accommodating portion 24C of the contact 24 with the sheet-like conductive member 11 being sandwiched therebetween when the deformed portion 23E is not formed at a tip of the extending portion 23D of the projection 23B, the extending portion 23D of the projection 23B is allowed to project in the +Z direction from the through hole 24E of the contact 24 as shown in FIG. 10, and thereafter, the deformed portion 23E is formed through heat deformation of the +Z directional end portion of the extending portion 23D of the projection 23B, whereby the connector as above can be assembled.

Note that a conductor portion 12A at the −Y directional end portion of the covered electric wire 12 is drawn from a covering portion 12B and crimped on the crimp terminal portion 25 in advance, and accordingly, the conductor portion 12A of the covered electric wire 12 is electrically connected to the flexible conductor 11A of the sheet-like conductive member 11 via the crimp terminal portion 25 and the contact 24.

As with the connector of Embodiment 1, also in the connector of Embodiment 2, the contact 24 is fixed to the base member 23B by means of the deformed portion 23E situated at a +Z directional end portion of the projection 23B while the flexible conductor 11A of the sheet-like conductive member 11 and the contact 24 are electrically connected to each other with the root portion 23C situated at a −Z directional end portion of the projection 23B of the base member 23. Therefore, unlike the connector of JP 2018-129244 A, it is not necessary to dispose a fixing member at a position away from the contact, whereby the connector can be decreased in size.

Further, presence of the deformed portion 23E of the projection 23B allows the flange 24B of the contact 24 to come into contact with the flexible conductor 11A of the sheet-like conductive member 11 disposed on the first surface P1 of the base member 23 with a predetermined contact pressure, and thus the contact 24 is also electrically connected to the flexible conductor 11A via the flange 24B, whereby the reliability of electric connection between the contact 24 and the flexible conductor 11A can be improved.

Embodiment 3

Figure 11:
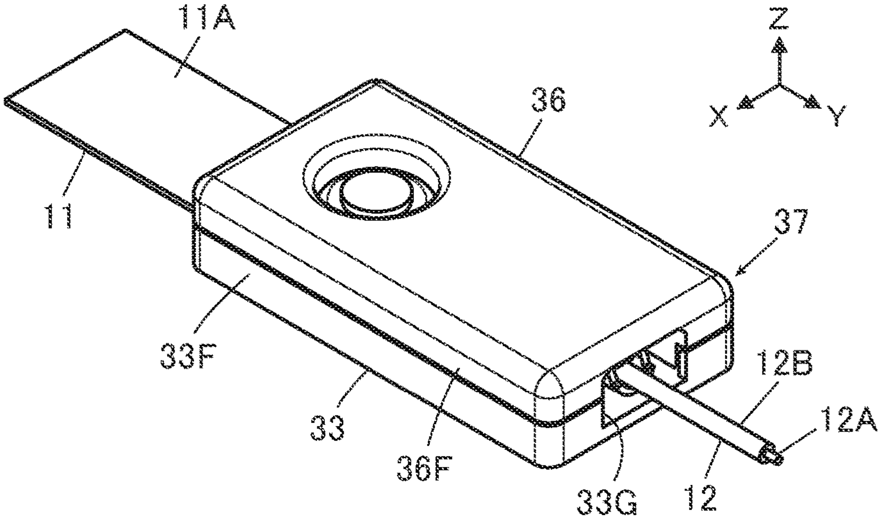
FIG. 11 is a perspective view showing a connector according to Embodiment 3.
Figure 12:
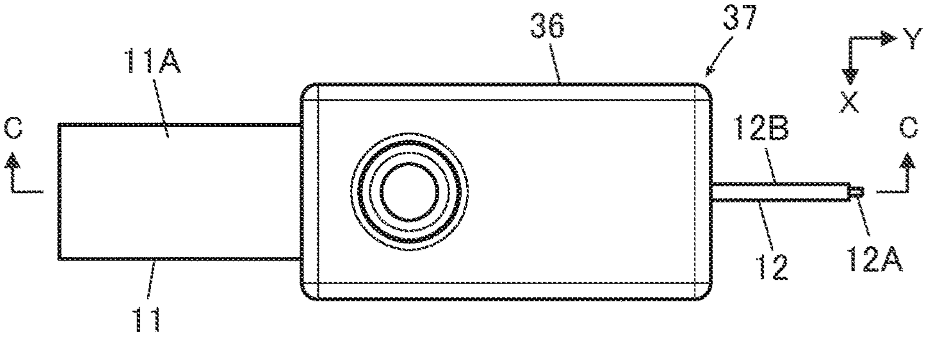
FIG. 12 is a plan view showing the connector according to Embodiment 3.

FIGS. 11 and 12 show a connector according to Embodiment 3. As with the connectors of Embodiments 1 and 2, this connector is configured such that a covered electric wire 12 being a conductive connection object is connected to a sheet-like conductive member 11, and includes a base member 33 and a top member 36 that are each made of an insulating resin material.

The sheet-like conductive member 11 and the covered electric wire 12 are the same as those used in Embodiments 1 and 2.

The base member 33 and the top member 36 have the same flat shape and the same size when viewed in the Z direction. A side wall portion 33F projecting in the +Z direction is formed at a periphery of the base member 33 while a side wall portion 36F projecting in the −Z direction is formed at a periphery of the top member 36, and these side wall portions 33F and 36F are joined to each other in the Z direction to thereby form a housing 37 of cuboidal shape composed of the base member 33 and the top member 36.

Cutout portions 33G are separately formed at a −Y directional end portion and a +Y directional end portion of the side wall portion 33F of the base member 33, and the sheet-like conductive member 11 and the covered electric wire 12 extend in the Y direction from the housing 37 separately through the cutout portions 33G.

Figure 13:
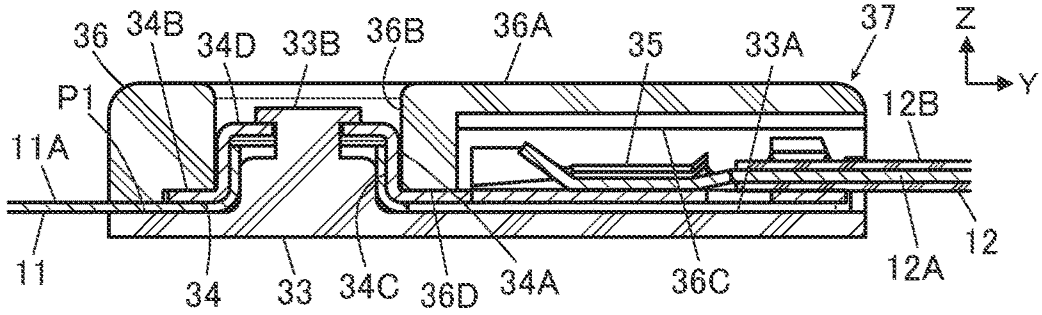
FIG. 13 is a cross-sectional view taken along line C-C in FIG. 12.

As shown in FIG. 13, as with the base member 23 used in Embodiment 2, the base member 33 includes a flat plate portion 33A of rectangular shape extending along an XY plane, a +Z direction side surface of the flat plate portion 33A forms a first surface P1, and a projection 33B extending in the +Z direction is formed to project on the first surface P1.

A conductive contact 34 is held by the base member 33. As with the contact 24 used in Embodiment 2, the contact 34 includes a tubular portion 34A of cylindrical shape, a flange 34B joined to a −Z directional end portion of the tubular portion 34A, and a top plate portion 34D of annular shape joined to a +Z directional end portion of the tubular portion 34A. A projection accommodating portion 34C is formed inside the tubular portion 34A, and a crimp terminal portion 35 integrally formed with the contact 34 is joined to the flange 34B.

The top member 36 is joined to the base member 33 to cover the base member 33 from the +Z direction and includes a flat plate portion 36A facing the flat plate portion 33A of the base member 33. The side wall portion 36F shown in FIG. 11 is formed to project in the −Z direction from a periphery of the flat plate portion 36A. In addition, the top member 36 is provided with a recessed portion 36B at a position corresponding to the projection 33B of the base member 33, and a crimp terminal accommodating portion 36C of recess shape at a position corresponding to the crimp terminal portion 35.

The recessed portion 36B penetrates the top member 36 in the Z direction, and a flange pressing portion 36D of annular shape extending along an XY plane and facing in the −Z direction is formed at a periphery of a −Z directional end portion of the recessed portion 36B.

In addition, the crimp terminal accommodating portion 36C is formed on the −Z direction side of the flat plate portion 36A, and the crimp terminal portion 35 joined to the contact 34 is accommodated in the crimp terminal accommodating portion 36C.

Figure 14:
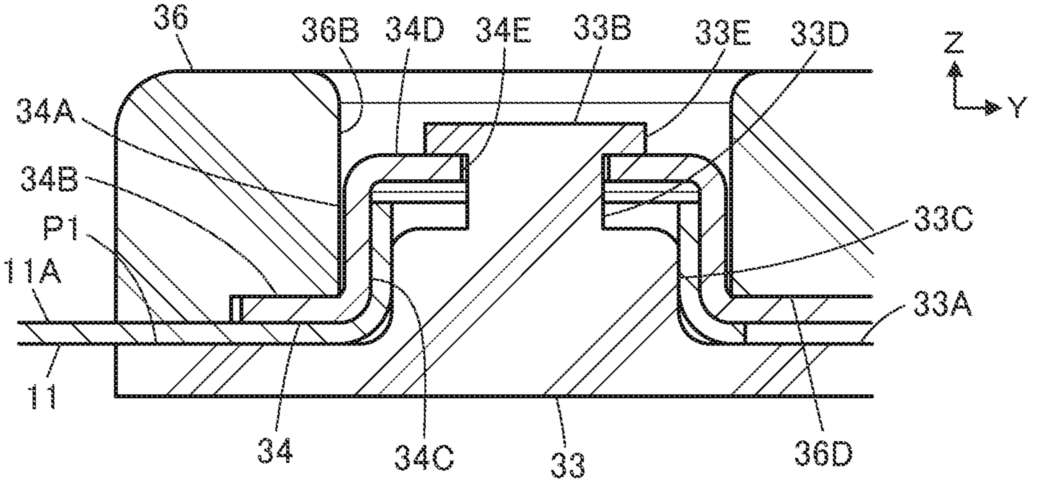
FIG. 14 is an enlarged view of an important part of FIG. 13.

As shown in FIG. 14 that is a partial enlarged view of FIG. 13, as with the projection 23B of the base member 23 used in Embodiment 2, the projection 33B of the base member 33 includes a root portion 33C joined to the first surface P1, an extending portion 33D extending in the +Z direction from a +Z directional end portion of the root portion 33C, and a deformed portion 33E joined to a +Z directional end portion of the extending portion 33D. In addition, the top plate portion 34D of the contact 34 is provided with a through hole 34E through which the extending portion 33D of the projection 33B passes.

On the +Z direction side of the top plate portion 34D of the contact 34, the deformed portion 33E of the projection 33B overhangs along an XY plane from the +Z directional end portion of the extending portion 33D and covers the top plate portion 34D around the through hole 34E. Consequently, the contact 34 is sandwiched between the deformed portion 33E of the projection 33B and the first surface P1 of the base member 33 and fixed to the base member 33 via the sheet-like conductive member 11.

In addition, the deformed portion 33E of the projection 33B is exposed in the +Z direction from the recessed portion 36B of the top member 36.

As with Embodiments 1 and 2, the first surface P1 of the base member 33 makes contact with the bottom surface on the −Z direction side of the sheet-like conductive member 11, and the sheet-like conductive member 11 is bent at a right angle at a position where the projection 33B is formed, and extends in the +Z direction while being sandwiched between an outer peripheral surface of the root portion 33C of the projection 33B and an inner peripheral surface of the projection accommodating portion 34C of the contact 34. Accordingly, the inner peripheral surface of the projection accommodating portion 34C of the contact 34 comes into contact with the flexible conductor 11A of the sheet-like conductive member 11A in a direction along an XY plane.

Here, the projection accommodating portion 34C of the contact 34 is formed in advance to have an inside diameter slightly smaller than a dimension obtained by adding a double of a thickness of the sheet-like conductive member 11 to an outside diameter of the root portion 33C of the projection 33B; therefore, the flexible conductor 11A of the sheet-like conductive member 11 is pressed by the root portion 33C of the projection 33B against the inner peripheral surface of the projection accommodating portion 34C of the contact 34 such that a predetermined contact pressure is applied thereto, whereby the contact 34 is electrically connected to the flexible conductor 11A.

In Embodiment 3, the projection 33B of the base member 33 and the tubular portion 34A of the contact 34 are accommodated in the recessed portion 36B penetrating the top member 36 in the Z direction, and the flange pressing portion 36D of annular shape formed at the periphery of the −Z directional end portion of the recessed portion 36B makes contact with the flange 34B of the contact 34 to press the flange 34B in the −Z direction toward the flexible conductor 11A of the sheet-like conductive member 11.

Figure 15:
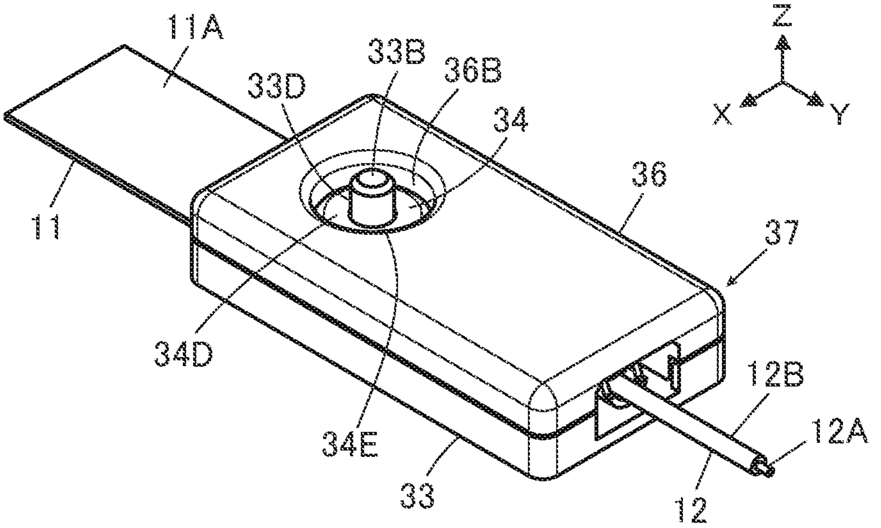
FIG. 15 is a perspective view showing the connector according to Embodiment 3 in the process of assembling.

By inserting the root portion 33C of the projection 33B into the projection accommodating portion 34C of the contact 34 with the sheet-like conductive member 11 being sandwiched therebetween when the deformed portion 33E is not formed at a tip of the extending portion 33D of the projection 33B, the extending portion 33D of the projection 33B is allowed to pass through the through hole 34E of the contact 34 and project in the +Z direction from the recessed portion 36B of the top member 36 as shown in FIG. 15, and thereafter, the deformed portion 33E is formed through heat deformation of the +Z directional end portion of the extending portion 33D of the projection 33B, whereby the connector as above can be assembled.

Note that a conductor portion 12A at the −Y directional end portion of the covered electric wire 12 is drawn from a covering portion 12B and crimped on the crimp terminal portion 35 in advance, and accordingly, the conductor portion 12A of the covered electric wire 12 is electrically connected to the flexible conductor 11A of the sheet-like conductive member 11 via the crimp terminal portion 35 and the contact 34.

As with the connectors of Embodiments 1 and 2, also in the connector of Embodiment 3, the contact 34 is fixed to the base member 33 by means of the deformed portion 33E situated at a +Z directional end portion of the projection 33B while the flexible conductor 11A of the sheet-like conductive member 11 and the contact 34 are electrically connected to each other with the root portion 33C situated at a −Z directional end portion of the projection 33B of the base member 33. Therefore, unlike the connector of JP 2018-129244 A, it is not necessary to dispose a fixing member at a position away from the contact, whereby the connector can be decreased in size.

Further, since not only the contact 34 is fixed to the base member 33 while being sandwiched between the deformed portion 33E of the projection 33B and the first surface P1 of the base member 33 via the sheet-like conductive member 11 but also the flange 34B of the contact 34 is pressed in the −Z direction toward the flexible conductor 11A of the sheet-like conductive member 11 by the flange pressing portion 36D of the top member 36, the contact 34 is also electrically connected to the flexible conductor 11A via the flange 34B, whereby the reliability of electric connection between the contact 34 and the flexible conductor 11A can be improved.

In addition, by applying a water-resistant adhesive between the flat plate portion 33A of the base member 33 and a −Z directional surface of the sheet-like conductive member 11, between a +Z directional surface of the sheet-like conductive member 11 and the flange 34B of the contact 34, between the flange 34B of the contact 34 and the flange pressing portion 36D of the top member 36, and between the top plate portion 34D of the contact 34 and the deformed portion 33E of the projection 33B, water can be prevented from penetrating from the outside of the connector to a connection part between the contact 34 and the flexible conductor 11A.

Further, by bonding a joint part between the side wall portion 33F of the base member 33 and the side wall portion 36F of the top member 36 with a water-resistant adhesive and sealing a drawn part of the sheet-like conductive member 11 drawn in the −Y direction from the housing 37, and a drawn part of the covered electric wire 12 drawn in the +Y direction from the housing 37, as well as the top plate portion 34D of the contact 34 and the deformed portion 33E of the projection 33B that are exposed in the +Z direction from the recessed portion 36B of the top member 36 using a water-resistant adhesive, a waterproof connector can be configured such that water is prevented from penetrating to the inside of the housing 37.

Note that, even when a contact in which a +Z directional end portion of a tubular portion is opened and which has no top plate portion like the contact 14 of Embodiment 1 is used instead of the contact 34, and a base member provided with, like the projection 13B of Embodiment 1, a projection having a deformed portion covering a +Z directional end portion of the tubular portion is used instead of the base member 33 provided with the projection 33B, a connector having the same effect as that in Embodiment 3 can be obtained.

Embodiment 4

Figure 16:
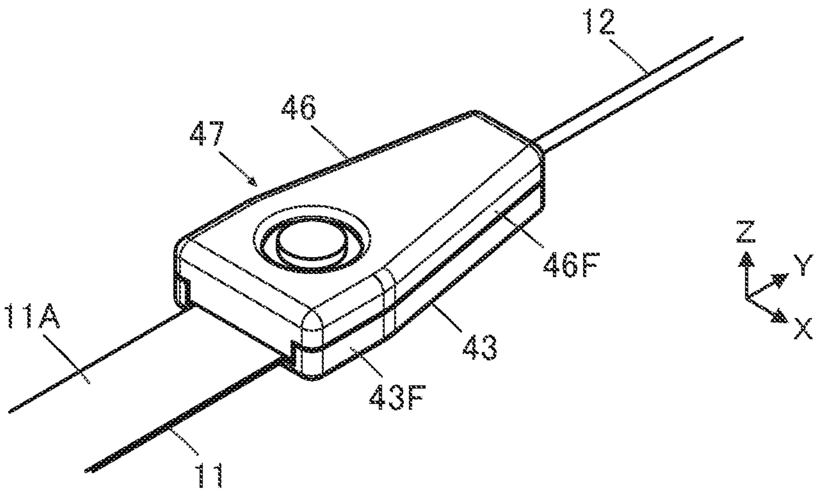
FIG. 16 is a perspective view showing a connector according to Embodiment 4.
Figure 17:
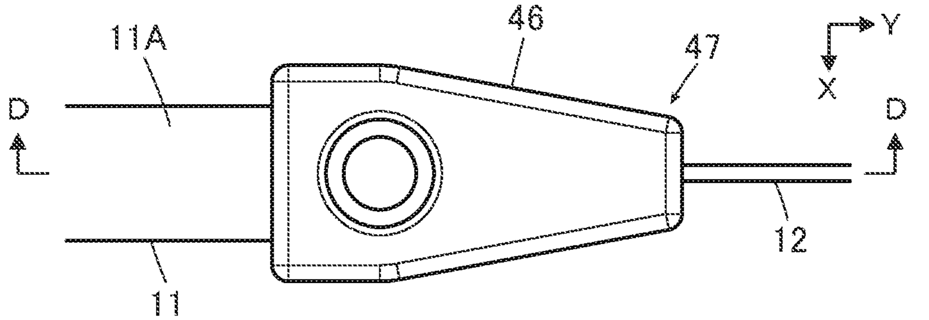
FIG. 17 is a plan view showing the connector according to Embodiment 4.

FIGS. 16 and 17 show a connector according to Embodiment 4. As with the connector of Embodiment 3, this connector is configured such that a covered electric wire 12 being a conductive connection object is connected to a sheet-like conductive member 11, and includes a base member 43 and a top member 46 each made of an insulating resin material.

The sheet-like conductive member 11 and the covered electric wire 12 are the same as those used in Embodiments 1 to 3.

The base member 43 and the top member 46 each have a flat shape apparently formed of a rectangular shape situated on the −Y direction side combined with a trapezoidal shape situated on the +Y direction side when viewed in the Z direction, and an X directional width that is narrower at its +Y directional end portion than at its −Y directional end portion. A side wall portion 43F projecting in the +Z direction is formed at a periphery of the base member 43 while a side wall portion 46F projecting in the −Z direction is formed at a periphery of the top member 46, and these side wall portions 43F and 46F are joined to each other in the Z direction to thereby form a housing 47 composed of the base member 43 and the top member 46.

Figure 18:
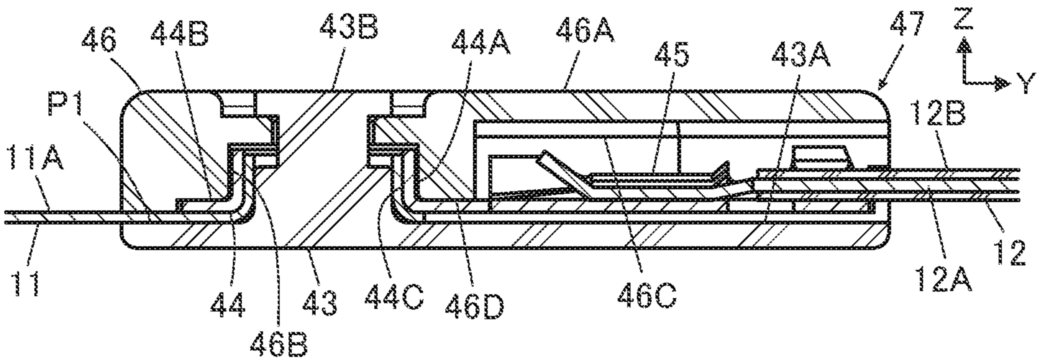
FIG. 18 is a cross-sectional view taken along line D-D in FIG. 17.

As shown in FIG. 18, as with the base member 13 used in Embodiment 1, the base member 43 includes a flat plate portion 43A extending along an XY plane, a +Z directional surface of the flat plate portion 43A forms a first surface P1, and a projection 43B extending in the +Z direction is formed to project on the first surface P1.

A conductive contact 44 is held by the base member 43. As with the contact 14 used in Embodiment 1, the contact 44 includes a tubular portion 44A of cylindrical shape having a central axis along the Z direction, and a flange 44B joined to a −Z directional end portion of the tubular portion 44A. A projection accommodating portion 44C is formed inside the tubular portion 44A, and a crimp terminal portion 45 integrally formed with the contact 44 is joined to the flange 44B.

The top member 46 is joined to the base member 43 to cover the base member 43 from the +Z direction and includes a flat plate portion 46A facing the flat plate portion 43A of the base member 43. In addition, the top member 46 is provided with a contact accommodating portion 46B of recess shape opened in the −Z direction at a position corresponding to the projection 43B of the base member 43, and a crimp terminal accommodating portion 46C of recess shape at a position corresponding to the crimp terminal portion 45.

A flange pressing portion 46D of annular shape extending along an XY plane and facing in the −Z direction is formed at a periphery of a −Z directional end portion of the contact accommodating portion 46B.

In addition, the crimp terminal accommodating portion 46C is formed on the −Z direction side of the flat plate portion 43A, and the crimp terminal portion 45 joined to the contact 44 is accommodated in the crimp terminal accommodating portion 46C.

Figure 19:
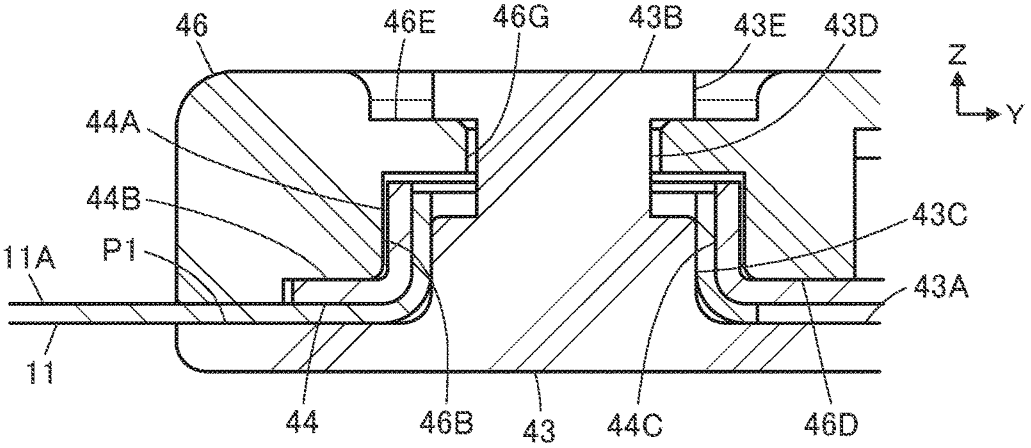
FIG. 19 is an enlarged view of an important part of FIG. 18.

As shown in FIG. 19 that is a partial enlarged view of FIG. 18, as with the projection 13B of the base member 13 used in Embodiment 1, the projection 43B of the base member 43 includes a root portion 43C joined to the first surface P1, an extending portion 43D extending in the +Z direction from a +Z directional end portion of the root portion 43C, and a deformed portion 43E joined to a +Z directional end portion of the extending portion 43D.

The top member 46 includes an overhang portion 46E of annular shape extending along an XY plane so as to cover a +Z directional end portion of the contact accommodating portion 46B, and the overhang portion 46E is provided with an opening portion 46G through which the extending portion 43D of the projection 43B passes.

On the +Z direction side of the overhang portion 46E of the top member 46, the deformed portion 43E of the projection 43B overhangs along an XY plane from the +Z directional end portion of the extending portion 43D and covers the overhang portion 46E around the opening portion 46G. Consequently, the top member 46 is sandwiched between the deformed portion 43E of the projection 43B and the first surface P1 of the base member 43 and fixed to the base member 43 via the sheet-like conductive member 11.

Further, the flange pressing portion 46D of annular shape formed at a periphery of a −Z directional end portion of the contact accommodating portion 46B of the top member 46 presses the flange 44B of the contact 44 in the −Z direction toward the flexible conductor 11A of the sheet-like conductive member 11 so that the contact 44 is fixed to the base member 43 via the top member 46.

As with Embodiment 1, the first surface P1 of the base member 43 makes contact with the bottom surface on the −Z direction side of the sheet-like conductive member 11, and the sheet-like conductive member 11 is bent at a right angle at a position where the projection 43B is formed, and extends in the +Z direction while being sandwiched between an outer peripheral surface of the root portion 43C of the projection 43B and an inner peripheral surface of the projection accommodating portion 44C of the contact 44. Accordingly, the inner peripheral surface of the projection accommodating portion 44C of the contact 44 comes into contact with the flexible conductor 11A of the sheet-like conductive member 11 in a direction along an XY plane.

Here, the projection accommodating portion 44C of the contact 44 is formed in advance to have an inside diameter slightly smaller than a dimension obtained by adding a double of a thickness of the sheet-like conductive member 11 to an outside diameter of the root portion 43C of the projection 43B; therefore, the flexible conductor 11A of the sheet-like conductive member 11 is pressed by the root portion 43C of the projection 43B against the inner peripheral surface of the projection accommodating portion 44C of the contact 44 such that a predetermined contact pressure is applied thereto, whereby the contact 44 is electrically connected to the flexible conductor 11A.

Figure 20:
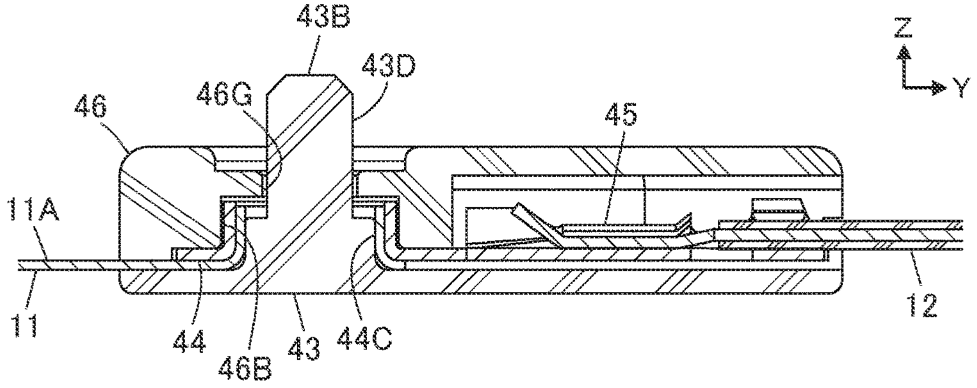
FIG. 20 is a cross-sectional view showing the connector according to Embodiment 4 in the process of assembling.

The root portion 43C of the projection 43B is inserted into the projection accommodating portion 44C of the contact 44 with the sheet-like conductive member 11 being sandwiched therebetween when the deformed portion 43E is not formed at a tip of the extending portion 43D of the projection 43B, and the extending portion 43D of the projection 43B is allowed to pass through the opening portion 46G of the top member 46 from the projection accommodating portion 44C of the contact 44 as shown in FIG. 20, and thereafter, the deformed portion 43E is formed through heat deformation of the +Z directional end portion of the extending portion 43D of the projection 43B projecting in the +Z direction from the opening portion 46G of the top member 46, whereby the connector as above can be assembled.

Note that a conductor portion 12A at the −Y directional end portion of the covered electric wire 12 is drawn from a covering portion 12B and crimped on the crimp terminal portion 45 in advance, and accordingly, the conductor portion 12A of the covered electric wire 12 is electrically connected to the flexible conductor 11A of the sheet-like conductive member 11 via the crimp terminal portion 45 and the contact 44.

As with the connectors of Embodiments 1 to 3, also in the connector of Embodiment 4, the contact 44 is fixed to the base member 43 by fixing the top member 46 to the base member 43 by means of the deformed portion 43E situated at a +Z directional end portion of the projection 43B while the flexible conductor 11A of the sheet-like conductive member 11 and the contact 44 are electrically connected to each other with the root portion 43C situated at a −Z directional end portion of the projection 43B of the base member 43. Therefore, unlike the connector of JP 2018-129244 A, it is not necessary to dispose a fixing member at a position away from the contact, whereby the connector can be decreased in size.

Further, since the flange 44B of the contact 44 is pressed in the −Z direction toward the flexible conductor 11A of the sheet-like conductive member 11 by the flange pressing portion 46D of the top member 46, the contact 44 is also electrically connected to the flexible conductor 11A via the flange 44B, whereby the reliability of electric connection between the contact 44 and the flexible conductor 11A can be improved.

In addition, as with the connector of Embodiment 3, by applying a water-resistant adhesive between the flat plate portion 43A of the base member 43 and a −Z directional surface of the sheet-like conductive member 11, between a +Z directional surface of the sheet-like conductive member 11 and the flange 44B of the contact 44, between the flange 44B of the contact 44 and the flange pressing portion 46D of the top member 46, and between the overhang portion 46E of the top member 46 and the deformed portion 43E of the projection 43B, water can be prevented from penetrating from the outside of the connector to the connection part between the contact 44 and the flexible conductor 11A.

Further, by bonding a joint part between the side wall portion 43F of the base member 43 and the side wall portion 46F of the top member 46 with a water-resistant adhesive and sealing a drawn part of the sheet-like conductive member 11 drawn in the −Y direction from the housing 47 and a drawn part of the covered electric wire 12 drawn in the +Y direction from the housing 47 using a water-resistant adhesive, a waterproof connector can be configured such that water is prevented from penetrating to the inside of the housing 47.

Note that, even when a contact having a top plate portion joined to a +Z directional end portion of a tubular portion like the contact 24 of Embodiment 2 is used instead of the contact 44, and a base member provided with, like the projection 23B of Embodiment 2, a projection having a deformed portion covering part of the top plate portion is used instead of the base member 43 provided with the projection 43B, a connector having the same effect as that in Embodiment 4 can be obtained.

Embodiment 5

Figure 21:
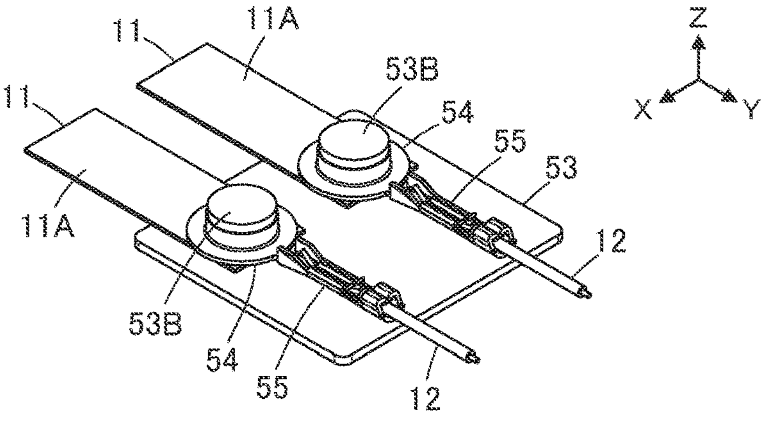
FIG. 21 is a perspective view showing a connector according to Embodiment 5.

FIG. 21 shows a connector according to Embodiment 5. This connector has a two-circuit configuration. Two projections 53B are formed to project on a base member 53, and two contacts 54 are fixed to the base member 53 separately by the two projections 53B. Each of the two contacts 54 is integrally joined to a corresponding crimp terminal portion 55.

The projection 53B and the contact 54 respectively have the same configurations as those of the projection 13B and the contact 14 used in Embodiment 1, and two covered electric wires 12 are separately electrically connected to flexible conductors 11A of two sheet-like conductive members 11 via the two contacts 54. In other words, electrical connection can be established in the two circuits with a single connector.

Note that even when the projection 23B and the contact 24 of Embodiment 2 are used instead of the projection 53B and the contact 54, a connector having a two-circuit configuration can be similarly formed. In addition, as with Embodiments 3 and 4, a connector having a two-circuit configuration provided with a housing composed of a base member and a top member can be formed.

Further, in addition to a connector having the two-circuit configuration, it is also possible to configure a connector having a multi-circuit configuration with three or more circuits using a plurality of projections formed on a common base member and a plurality of contacts held by the plurality of projections.

Embodiment 6

Figure 22:
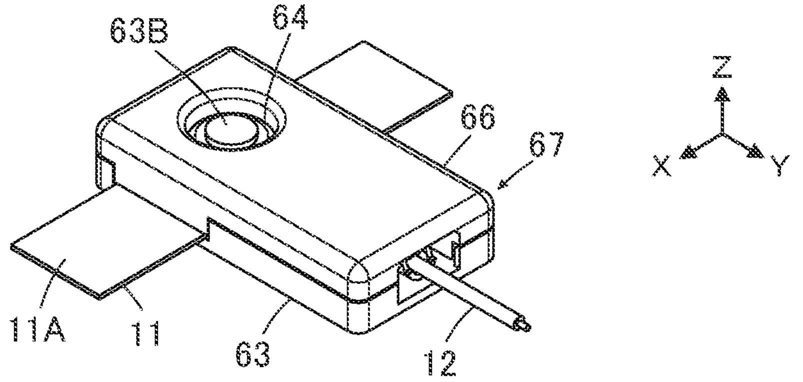
FIG. 22 is a perspective view showing a connector according to Embodiment 6.
Figure 23:
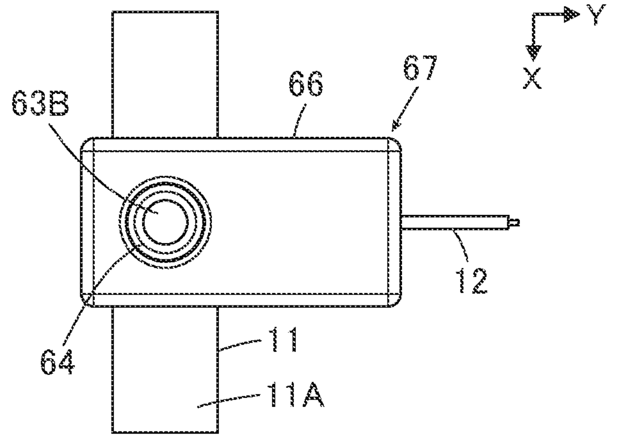
FIG. 23 is a plan view showing the connector according to Embodiment 6.

FIGS. 22 and 23 show a connector according to Embodiment 6. As with the connector of Embodiment 3, this connector includes a housing 67 of cuboidal shape composed of a base member 63 and a top member 66. The base member 63 includes a projection 63B, and a contact 64 is fixed to the base member 63 by the projection 63B. The projection 63B and the contact 64 respectively have the same configurations as those of the projection 33B and the contact 34 in Embodiment 3. A flexible conductor 11A of a sheet-like conductive member 11 is electrically connected to a covered electric wire 12 via the contact 64.

Meanwhile, not an end portion of the sheet-like conductive member 11 but a middle part of the flexible conductor 11A of the sheet-like conductive member 11 having a band shape and extending in the X direction is electrically connected to the covered electric wire 12 via the contact 64. Therefore, the sheet-like conductive member 11 extends from the housing 67 to each of opposite sides in the X direction of the housing 67.

By electrically connecting a separate electrode (not shown) to each of the flexible conductor 11A of the sheet-like conductive member 11 drawn in the −X direction from the housing 67 and the flexible conductor 11A of the sheet-like conductive member 11 drawn in the +X direction from the housing 67, the two electrodes can be electrically connected to a single covered electric wire 12. In other words, by applying the connector according to Embodiment 6 to a smart cloth, biological data obtained from the two electrodes separately disposed at two measurement positions can be sent to the single covered electric wire 12.

While the connector of Embodiment 6 has substantially the same configuration as that of the connector of Embodiment 3 shown in FIGS. 11 and 12, even when the connector has substantially the same configuration as that of the connector of Embodiment 1 shown in FIGS. 1 and 2, the sheet-like conductive member 11 connected to the single covered electric wire 12 can similarly extend in two directions, i.e., the −X direction and the +X direction. Further, even when the connector has substantially the same configuration as that of the connector of Embodiment 2 shown in FIGS. 6 and 7 or the connector of Embodiment 4 shown in FIGS. 16 and 17, the sheet-like conductive member 11 connected to the single covered electric wire 12 can similarly extend in two directions, i.e., the −X direction and the +X direction.

In addition, by making the sheet-like conductive member 11 be branched, the sheet-like conductive member 11 extending in three or more directions can be electrically connected to the single covered electric wire 12.

Note that an electrode disposed at a measurement position of a smart cloth can be formed of a conductive member having the same configuration as that of the sheet-like conductive member 11, and in this case, the sheet-like conductive member 11 integrally formed with the electrode can be connected to the covered electric wire 12 by means of any of the connectors of Embodiments 1 to 6.

Figure 24:
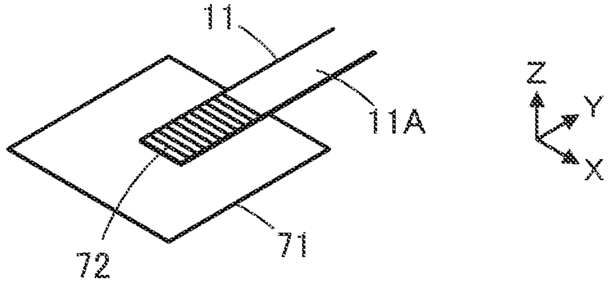
FIG. 24 is a perspective view showing a top surface of an electrode to which a sheet-like conductive member is connected.
Figure 25:
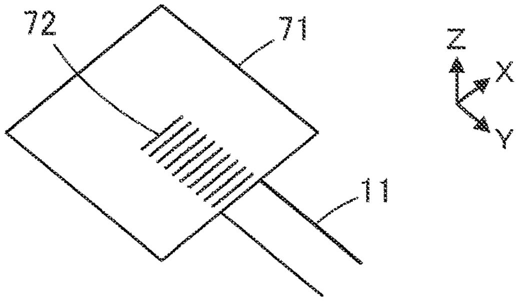
FIG. 25 is a perspective view showing a bottom surface of the electrode to which the sheet-like conductive member is connected.
Figure 26:
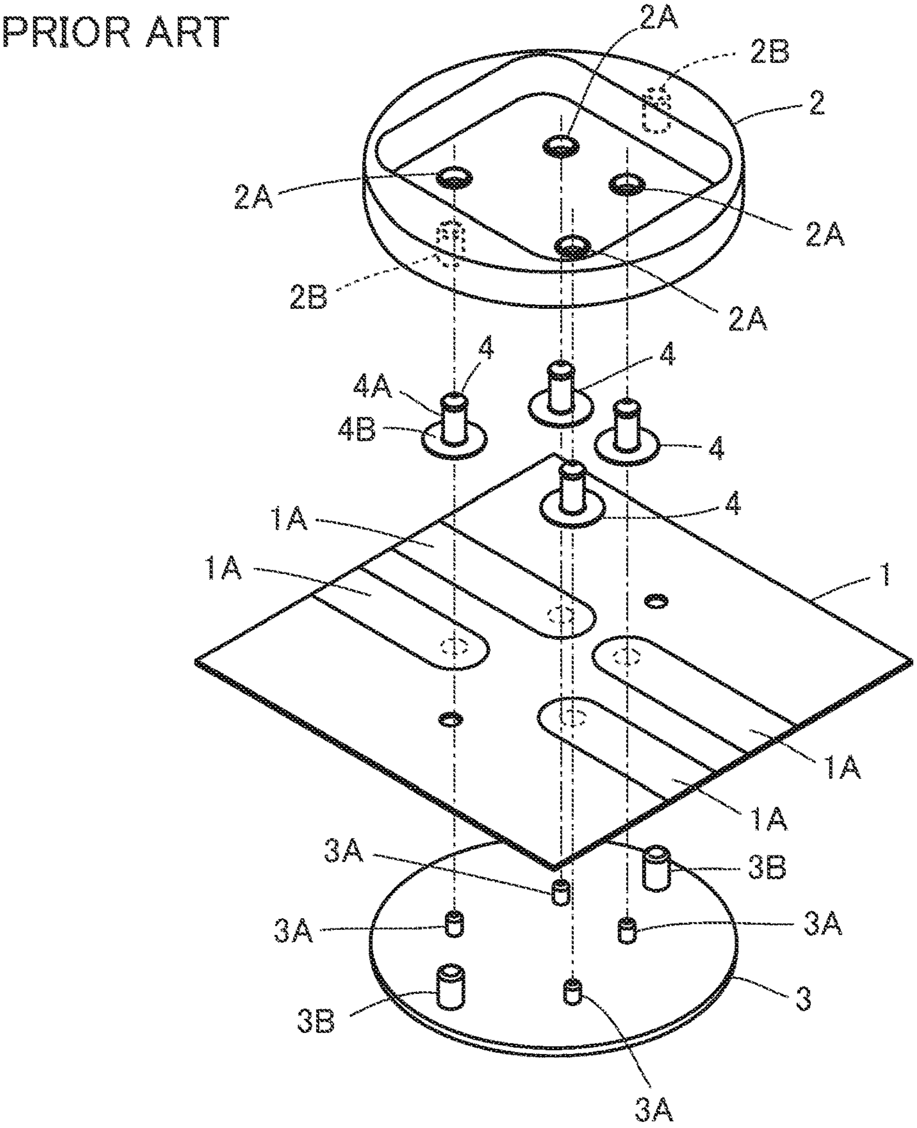
FIG. 26 PRIOR ART
FIG. 26 is an exploded perspective view showing a conventional connector.
Figure 27:
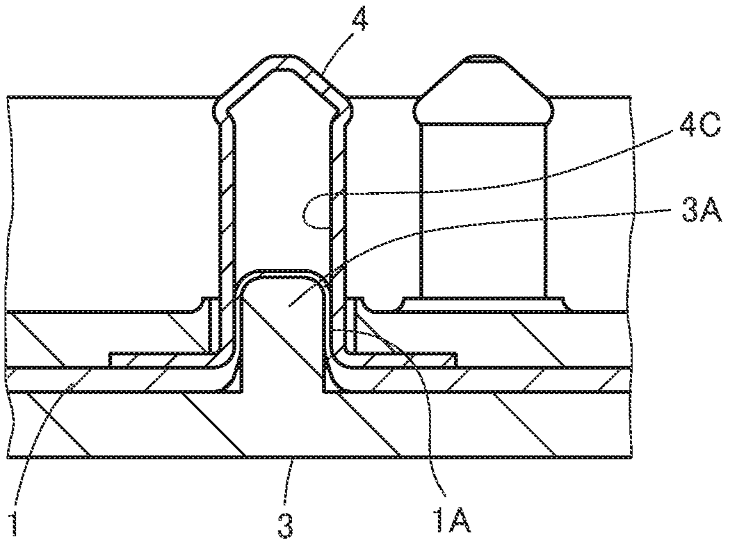
FIG. 27 PRIOR ART
FIG. 27 is a partial cross-sectional view showing the conventional connector.

In addition, when the electrode 71 and the sheet-like conductive member 11 are formed as separate components as shown in FIGS. 24 and 25, by sewing the sheet-like conductive member 11 to the electrode 71 with a conductive yarn 72 for example, the flexible conductor 11A of the sheet-like conductive member 11 is electrically connected to the electrode 71.

Note that in a case where the flexible conductor 11A of the sheet-like conductive member 11 and a conductive surface of the electrode 71 overlap and come into contact with each other, even when the sheet-like conductive member 11 is sewn to the electrode 71 with an insulating yarn, the flexible conductor 11A of the sheet-like conductive member 11 can be electrically connected to the conductive surface of the electrode 71. For example, in a case where the sheet-like conductive member 11 and the electrode 71 are each formed of a conductive fabric woven using a conductive yarn, regardless of whether a yarn used in sewing has conductivity or insulating properties, the flexible conductor 11A can be electrically connected to the electrode 71 by sewing the sheet-like conductive member 11 to the electrode 71.

In Embodiments 1 to 6 above, the covered electric wire 12 is connected to the contact 14, 24, 34, 44, 54 by press-fitting the conductor portion 12A of the covered electric wire 12 to the crimp terminal portion 15, 25, 35, 45, 55, but the invention is not limited thereto, and the covered electric wire 12 can be connected by known various methods such as screw fixing, soldering, welding, and adhesion.

In addition, in Embodiments 1 to 6 above, the covered electric wire 12 is used as a conductive connection object connected to the sheet-like conductive member 11, but an electric wire having only the conductor portion 12A whose outer periphery is not covered with the covering portion 12B made of an insulating material may also be used. Further, various conductors such as a conductor of band shape other than an electric wire can be connected to the contact 14, 24, 34, 44, 54 as a connection object.

What is claimed is:

1. A connector in which a covered electric wire forming a connection object having conductivity is connected to a flexible conductor exposed at least on a top surface of a sheet-like conductive member having the top surface and a bottom surface facing in opposite directions from each other, the connector comprising:

a base member including a first surface facing the bottom surface of the sheet-like conductive member and a projection formed to project on the first surface; and a contact having conductivity, the contact including a projection accommodating portion of recess shape through which the projection of the base member penetrates and being connected to the connection object, wherein the projection includes a root portion accommodated in the projection accommodating portion of the contact, an extending portion jointed to the root portion, and a deformed portion overhanging from a tip of the extending portion in a direction along the first surface, wherein the contact includes a tubular portion having an end facing the first surface of the base member and another end facing in an opposite direction from the first surface of the base member, and the projection accommodating portion is formed inside the tubular portion, wherein the contact includes a flange joined to the one end of the tubular portion and extending in a direction along the first surface of the base member, wherein the first surface of the base member makes contact with the bottom surface of the sheet-like conductive member, the contact is fixed to the base member by being sandwiched between the sheet-like conductive member disposed on the first surface of the base member and the deformed portion of the projection in a state where the root portion of the projection is accommodated in the projection accommodating portion with the sheet-like conductive member being sandwiched therebetween, and an inner peripheral surface of the projection accommodating portion makes contact with the flexible conductor of the sheet-like conductive member in a direction parallel to the first surface and the flange of the contact makes contact with the flexible conductor of the sheet-like conductive member in a direction perpendicular to the first surface, whereby the connection object is electrically connected to the flexible conductor via the contact, wherein the contact includes a top plate portion of annular shape joined to the another end of the tubular portion and provided with a through hole through which the extending portion of the projection passes, and wherein the deformed portion of the projection covers the top plate portion around the through hole.

2. The connector according to claim 1, wherein the another end of the tubular portion is opened, and wherein the deformed portion of the projection covers the another end of the tubular portion.

3. The connector according to claim 1, further comprising a top member that covers the base member and is fixed to the base member, wherein the top member has a recessed portion accommodating the projection of the base member and the tubular portion of the contact.

4. The connector according to claim 1, further comprising a crimp terminal portion joined to the flange and to be connected with the connection object.

5. The connector according to claim 1, wherein the base member is made of an insulating resin material.

6. The connector according to claim 1, wherein a plurality of the contacts are fixed to the base member, and wherein a plurality of the connection objects are electrically connected to a plurality of the flexible conductors via the plurality of the contacts.

7. The connector according to claim 1, wherein the flexible conductor at a middle part of the sheet-like conductive member having a band shape is electrically connected to the connection object via the contact, and wherein the sheet-like conductive member extends in each of a plurality of directions from the contact.

8. A connector in which a covered electric wire forming a connection object having conductivity is connected to a flexible conductor exposed at least on a top surface of a sheet-like conductive member having the top surface and a bottom surface facing in opposite directions from each other, the connector comprising:

a base member including a first surface facing the bottom surface of the sheet-like conductive member and a projection formed to project on the first surface;

a top member that covers the base member and is fixed to the base member; and a contact having conductivity, the contact including a projection accommodating portion of recess shape through which the projection of the base member penetrates and being connected to the connection object, wherein the projection includes a root portion accommodated in the projection accommodating portion of the contact, an extending portion jointed to the root portion, and a deformed portion overhanging from a tip of the extending portion in a direction along the first surface, wherein the contact includes a tubular portion having an end facing the first surface of the base member and another end facing in an opposite direction from the first surface of the base member, and the projection accommodating portion is formed inside the tubular portion, wherein the contact includes a flange joined to the one end of the tubular portion and extending in a direction along the first surface of the base member, wherein the first surface of the base member makes contact with the bottom surface of the sheet-like conductive member, the contact is fixed to the base member by being sandwiched between the sheet-like conductive member disposed on the first surface of the base member and the deformed portion of the projection in a state where the root portion of the projection is accommodated in the projection accommodating portion with the sheet-like conductive member being sandwiched therebetween, and an inner peripheral surface of the projection accommodating portion makes contact with the flexible conductor of the sheet-like conductive member in a direction parallel to the first surface and the flange of the contact makes contact with the flexible conductor of the sheet-like conductive member in a direction perpendicular to the first surface, whereby the connection object is electrically connected to the flexible conductor via the contact, wherein the top member includes a contact accommodating portion of recess shape for accommodating the tubular portion of the contact, and an overhang portion of annular shape facing the contact accommodating portion and provided with an opening portion through which the extending portion of the projection passes, wherein the deformed portion of the projection covers the overhang portion around the opening portion, and wherein the contact is fixed to the base member via the top member.

* * * * *